United States Patent
Hussain

(10) Patent No.: US 9,319,708 B2
(45) Date of Patent: Apr. 19, 2016

(54) SYSTEMS AND METHODS OF IMPROVED MOTION ESTIMATION USING A GRAPHICS PROCESSING UNIT

(75) Inventor: Zahid Hussain, England (GB)

(73) Assignee: VIA TECHNOLOGIES, INC., Taipei (TW)

( * ) Notice: Subject to any disclaimer, the term of this patent is extended or adjusted under 35 U.S.C. 154(b) by 2779 days.

(21) Appl. No.: 11/763,797

(22) Filed: Jun. 15, 2007

(65) Prior Publication Data

US 2007/0291846 A1 Dec. 20, 2007

Related U.S. Application Data

(60) Provisional application No. 60/814,623, filed on Jun. 16, 2006.

(51) Int. Cl.
| | |
|---|---|
| *H04N 11/02* | (2006.01) |
| *H04N 19/523* | (2014.01) |
| *H04N 19/56* | (2014.01) |
| *H04N 19/43* | (2014.01) |
| *H04N 19/533* | (2014.01) |

(52) U.S. Cl.
CPC .............. *H04N 19/523* (2014.11); *H04N 19/43* (2014.11); *H04N 19/533* (2014.11); *H04N 19/56* (2014.11)

(58) Field of Classification Search
USPC ............... 375/240.16, 240.12, 240.1, 240.15, 375/240.24
See application file for complete search history.

(56) References Cited

U.S. PATENT DOCUMENTS

| 5,894,526 A | 4/1999 | Watanabe et al. |
|---|---|---|
| 5,973,748 A | 10/1999 | Horiguchi et al. |
| 6,496,537 B1 | 12/2002 | Kranawetter et al. |

(Continued)

FOREIGN PATENT DOCUMENTS

| JP | 2001-285802 | 10/2001 |
|---|---|---|
| WO | 2004/030369 | 4/2004 |

(Continued)

OTHER PUBLICATIONS

An adaptive cross search algorithm for block matching motion estimation, Luo et al, IEEE 2004.*

(Continued)

*Primary Examiner* — Bradley Holder
*Assistant Examiner* — Jahangir Kabir
(74) *Attorney, Agent, or Firm* — McClure, Qualey & Rodack, LLP

(57) ABSTRACT

The embodiments disclosed herein provide systems and methods for improved motion estimation using a graphics processing unit. One such embodiment includes a method for determining a motion vector describing motion relative to a reference block, which comprises determining which of a plurality of prediction blocks is a good match with the reference block, according to a match criteria. The method further comprises performing a local area exhaustive search, in an area centered around the good match prediction block, to produce a best match with the reference block. The best match has integral pixel resolution. The method further comprises modeling the degree of match between the best match and the reference block as a quadratic surface and analytically determining a minima of the quadratic surface, corresponding to a best matching block with fractional resolution. The method further comprises computing a fractional motion vector based on the best matching block with fractional resolution.

19 Claims, 12 Drawing Sheets

(56) References Cited

U.S. PATENT DOCUMENTS

| | | |
|---|---|---|
| 6,546,120 B1 | 4/2003 | Etoh et al. |
| 6,717,988 B2 | 4/2004 | Peng et al. |
| 6,871,001 B1 | 3/2005 | Okada |
| 7,684,489 B2 | 3/2010 | Johansen et al. |
| 8,498,339 B2 * | 7/2013 | Chen .................... H04N 19/533 375/240.16 |
| 2003/0072374 A1 * | 4/2003 | Sohm ........................ 375/240.16 |
| 2003/0099295 A1 * | 5/2003 | Averbuch et al. ........ 375/240.16 |
| 2004/0071217 A1 | 4/2004 | Lin |
| 2004/0202373 A1 | 10/2004 | Lee et al. |
| 2005/0122341 A1 | 6/2005 | MacInnis et al. |
| 2005/0135488 A1 * | 6/2005 | Selby ........................ 375/240.17 |
| 2005/0262276 A1 | 11/2005 | Singh et al. |

FOREIGN PATENT DOCUMENTS

| | | |
|---|---|---|
| WO | 2004/091101 | 10/2004 |
| WO | WO 2004/105399 | 12/2004 |

OTHER PUBLICATIONS

Adaptive Irregular Pattern Search With Matching Prejudgment for Fast Block-Matching Motion Estimation, Nie et al, IEEE 2005.*
Taiwan Office Action dated Jan. 31, 2011.
English language translation (computer-generated translation) of JP 2001-285802 (published Oct. 12, 2001).

* cited by examiner

SYSTEMS AND METHODS OF IMPROVED MOTION ESTIMATION USING A GRAPHICS PROCESSING UNIT

CROSS REFERENCE TO RELATED APPLICATIONS

This application claims the benefit of U.S. Provisional Application No. 60/814,623, filed Jun. 16, 2006.

FIELD OF THE DISCLOSURE

The present disclosure relates to graphics processor units, and more specifically to a graphics processor unit that contains features for video compression.

BACKGROUND

Personal computers and consumer electronic devices are used for a variety of entertainment functions. These entertainment functions can be roughly divided into two different types: that which uses computer-generated graphics, such as computer games; and that which uses compressed video streams, such as programs pre-recorded onto digital video disk (DVD), and digital programming provided to a set-top box by cable or satellite operators. The second type also includes encoding of analog video streams, such as performed by a digital video recorder (DVR).

Computer-generated graphics are typically generated by a graphics processing unit (GPU). A GPU is a specialized type of microprocessor found on computer game consoles and some personal computers. A GPU is optimized to perform fast rendering of three-dimensional primitive objects such as triangles, quadrilaterals, etc. The primitives are described with vertices, where each vertex has attributes (e.g., color), and textures can be applied to the primitives. The result of the rendering is a two-dimensional array of pixels which appears on a computer display or monitor.

Encoding and decoding of video streams involves computations of a different sort (e.g., discrete cosine transform, motion estimation, motion compensation, inloop filtering). These computations are typically handled by a general purpose central processing unit (CPU) in combination with specialized hardware logic such as application-specific integrated circuits (ASICs). Conventional solutions thus require consumers to use multiple computing platforms to meet their entertainment. A single computing platform that handles both computer-generated graphics and video encoding and/or decoding is therefore desirable.

SUMMARY

The embodiments disclosed herein provide systems and methods for improved motion estimation using a graphics processing unit. One such embodiment includes a method for determining a motion vector describing motion relative to a reference block. This method comprises determining which of a plurality of prediction blocks is a good match with the reference block, according to a match criteria. The method further comprises performing a local area exhaustive search to produce a best match with the reference block. The search is performed in an area centered around the good match prediction block. The best match has integral pixel resolution. The method further comprises modeling the degree of match between the best match and the reference block as a quadratic surface and analytically determining a minima of the quadratic surface. The minima corresponds to a best matching block with fractional resolution. The method further comprises computing a fractional motion vector based on the best matching block with fractional resolution.

Another embodiment includes a method for determining a motion vector describing motion relative to a reference block. The method comprises determining which of a plurality of prediction blocks is a good match with the reference block, according to a match criteria. The method further comprises performing a local area exhaustive search to produce a best match with the reference block. The search is performed in an area centered around the good match prediction block. The best match has integral pixel resolution. The method further comprises analytically determining a minima of a quadratic surface which models the degree of match between the best match and the reference block. The minima corresponds to a best matching block with fractional resolution.

Another embodiment includes a computer readable medium having a program for determining a motion vector. The program comprises logic configured to perform the step of determining which of a plurality of prediction blocks is a good match with the reference block, according to a match criteria. The program further comprises logic configured to perform the step of performing a local area exhaustive search to produce a best match with the reference block. The search is performed in an area centered around the good match prediction block. The best match has integral pixel resolution. The program further comprises logic configured to perform the step of modeling the degree of match between the best match and the reference block as a quadratic surface. The program further comprises logic configured to perform the step of analytically determining a minima of the quadratic surface. The minima corresponds to a best matching block with fractional resolution. The program further comprises logic configured to perform the step of computing a fractional motion vector based on the best matching block with fractional resolution.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

1. Computing Platform for Video Encoding

Figure 1:
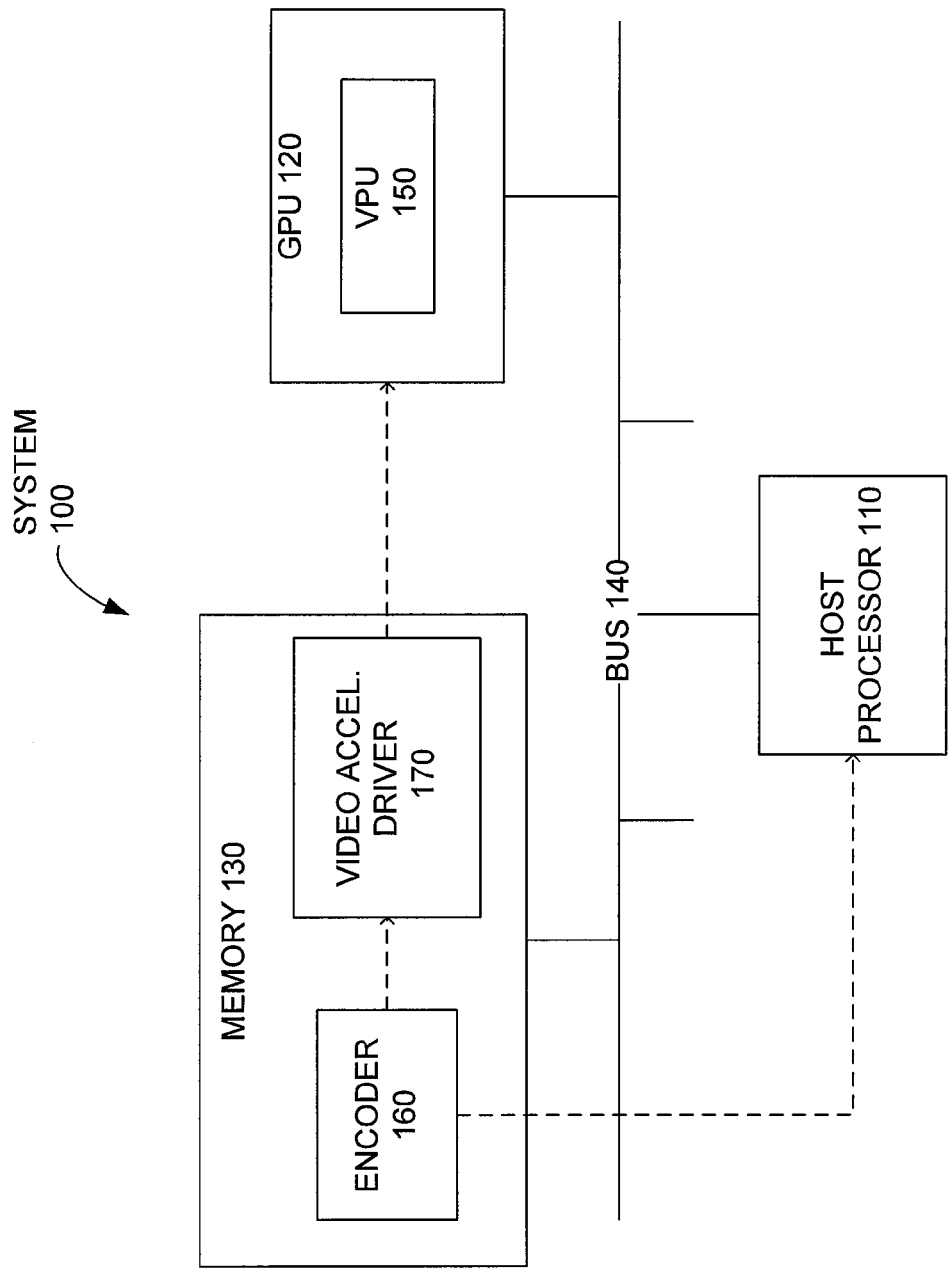
FIG. 1 is a block diagram of an exemplary computing platform for both graphics and video encoding and/or decoding.

FIG. 1 is a block diagram of an exemplary computing platform for both graphics and video encoding and/or decoding. System 100 includes a general purpose CPU 110 (hereinafter referred to as host processor), a graphics processor (GPU) 120, memory 130, and bus 140. GPU 120 includes a video processing unit 150 which accelerates video encoding and/or decoding, as will be described herein. The video acceleration functions of GPU 120 are made available as instructions which execute on GPU 120.

Software encoder 160 and video acceleration driver 170 reside in memory 130. Encoder 160 executes on host processor 110. Through an interface provided by video acceleration driver 170, encoder 160 can also cause video acceleration instructions to be issued to GPU 120. Thus, system 100 performs video encoding through host processor software which uses video acceleration features of GPU 120. In this manner, computationally intensive blocks which are frequently executed are offloaded to GPU 120, while more complex operations are performed by host processor 110.

Omitted from FIG. 1 are a number of conventional components, known to those skilled in the art, that are unnecessary to explain the video acceleration features of GPU 120. A basic overview of video encoding will be presented next, followed by a discussion of how one video encoder component (the motion estimator) utilizes video acceleration functions provided by GPU 120.

2. Video Encoder

Figure 2:
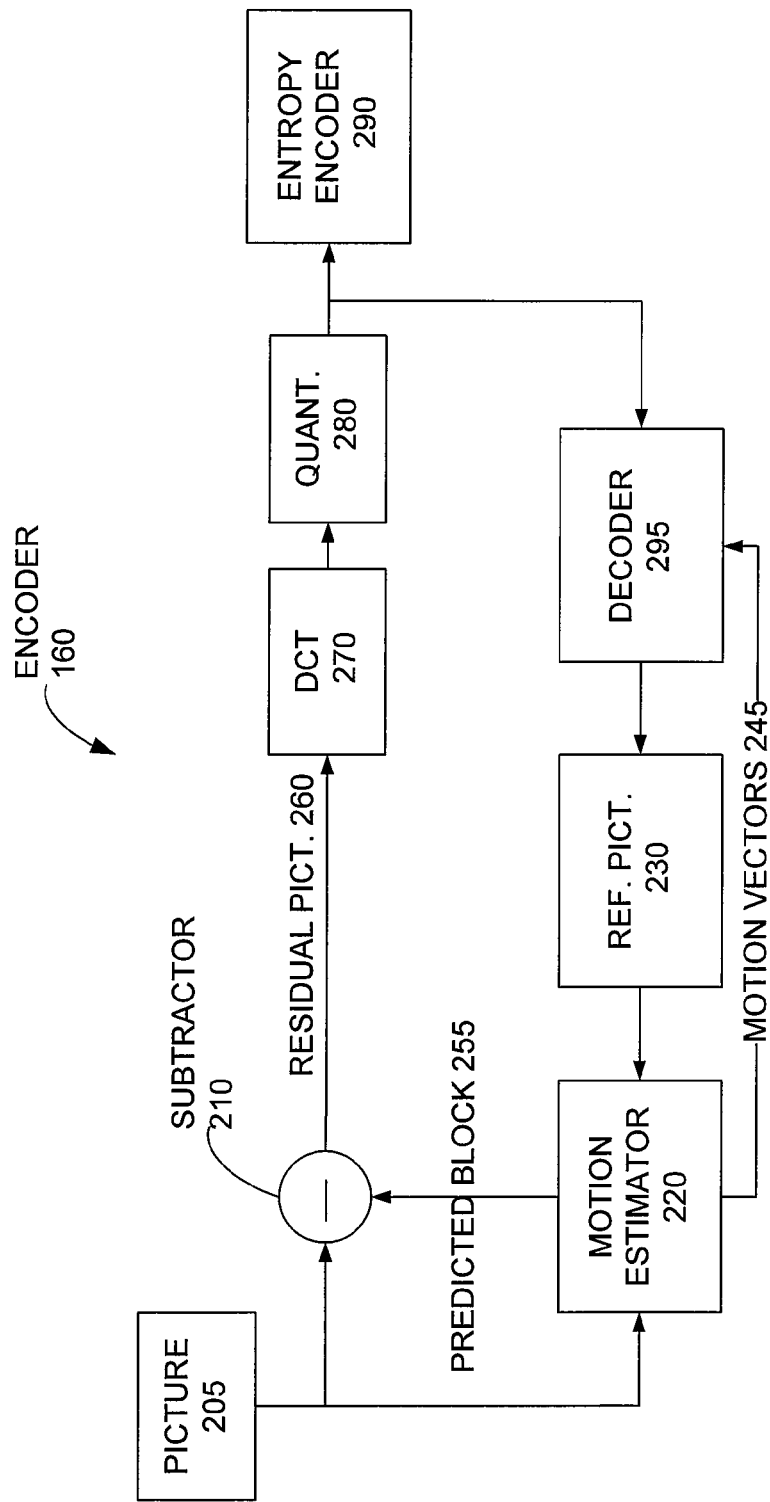
FIG. 2 is a functional diagram of the video encoder 160 of FIG. 1.

FIG. 2 is a functional diagram of the video encoder 160 of FIG. 1. Input to encoder 160 is a picture (205) which is composed of pixels. Encoder 160 works by taking advantage of temporal and spatial similarities within picture 205, and encoded the similarities by determining differences within a frame (spatial) and/or between frames (temporal). Spatial encoding takes advantage of the fact that neighboring pixels within a picture are often the same, or are related, so that only the differences are encoded. Temporal encoding takes advantage of the fact that often many pixels in a series of pictures will have the same value, so that only changes from one picture to the next are encoded. Encoder 160 also uses entropy encoding to take advantage of statistical redundancy: some patterns occur more commonly than others, so the commonly occurring ones are represented with shorter codes. Examples of entropy encoding include Huffman coding, run-length encoding, arithmetic coding, and context-adaptive binary arithmetic coding.

In this example embodiment, blocks of incoming picture 205 are provided to a subtractor 210 and a motion estimator 220. Motion estimator 220 compares blocks in incoming picture 205 to blocks in a previously-stored reference picture 230 to find similar blocks. Motion estimator 220 calculates a set of motion vectors 245 which represent the displacement between the matching blocks. The combination of motion vectors 245 and the matching block of reference picture 230, called a predicted block 255, represents temporal encoding.

The predicted block 255 is provided to subtractor 210, which subtracts predicted block 255 from incoming picture 205 to produce a residual picture 260. Residual picture 260 is provided to a discrete cosine transform (DCT) block 270 and a quantizer 280, which perform spatial encoding. The output of quantizer 280 (e.g., a set of quantized DCT coefficients) is encoded by entropy encoder 290.

For some types of pictures (information or I-frames, and prediction or P-frames), the spatially encoded residual from quantizer 280 is provided to an internal decoder 295. Decoder 295 uses the spatially encoded residual 260, in combination with motion vectors 245 produced by motion estimator 220, to decode the spatially encoded picture 205. The reconstructed picture is stored in the reference picture buffer 295, which is provided to motion estimator 220 as described earlier.

As discussed earlier in connection with FIG. 1, encoder 160 runs on host processor 110 but also takes advantage of video acceleration instructions provided by GPU 120. Specifically, the algorithm implemented by motion estimator 220 uses of a sum-of-differences (SAD) instruction provided by GPU 120 to achieve accurate motion estimation with a relatively low computational cost. This motion estimation algorithm will now be described in more detail.

3. Software Motion Estimation Algorithm: Search Algorithm

Figure 3:
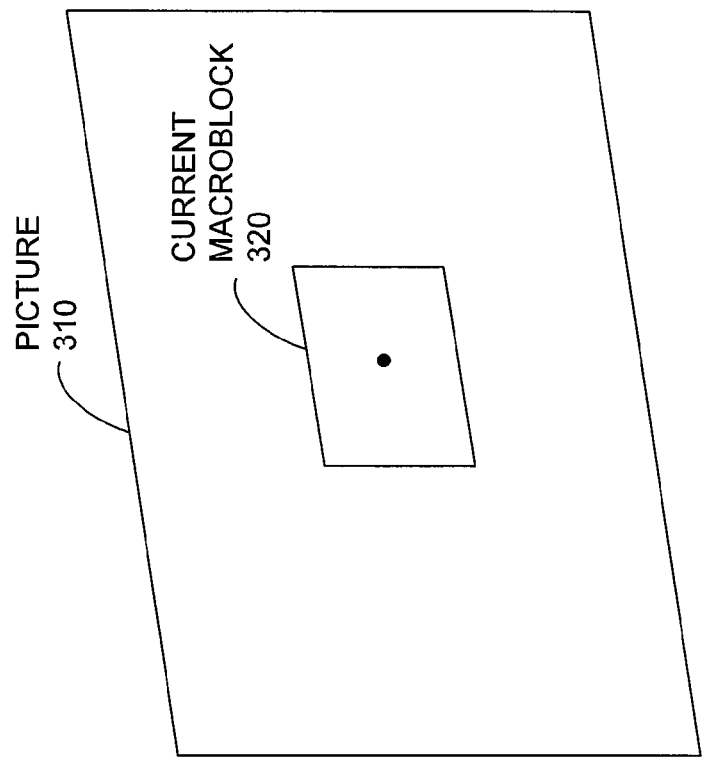
FIG. 3 illustrates the division of current picture into non-overlapping sections called macroblocks.
Figure 3:
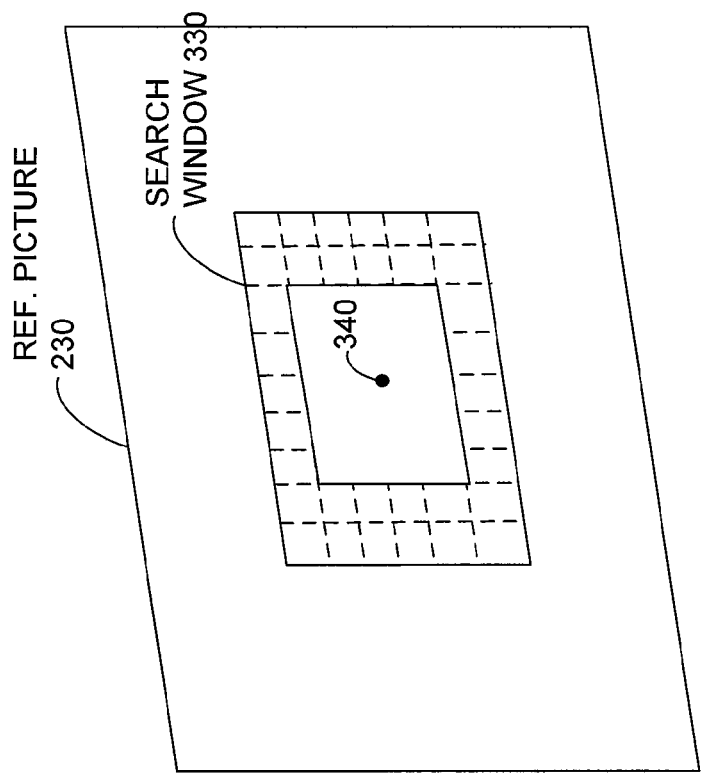

As shown in FIG. 3, motion estimator 220 divides current picture 205 into non-overlapping sections called macroblocks. The size of the macroblock may vary depending on the standard used by the encoder (e.g., MPEG-2, H.264, VC), and the size of the picture. In the example embodiment described herein, and in a number of different encoding standards, a macroblock is 16×16 pixels. A macroblock is further subdivided to blocks, where the block size may be n×n, M×M, 4×8, M×N, 16×8, or 8×16.

In MPEG-2, each macroblock may only have one motion vector, so motion estimation is based on macroblocks. H.264 allows up to 32 motion vectors (depending on the level), so in H.264, motion estimation is calculated on the basis of 4×4 or 8×8 blocks. In a variant of H.264, called AVS, the motion estimation blocks are always 8×8. In VC-1, it may be 4×4 or 8×8.

The motion estimation algorithm 220 performs motion estimation on each macroblock in a current picture 310, with the goal of finding a block in a previously-coded reference picture 230 that is similar to the macroblock in current picture 310. The displacement between the matching block in reference picture 230 and the macroblock in current picture 310 is computed and stored as a motion vector (245 in FIG. 2).

For ease of explanation, the motion estimation process will be described for one particular macroblock (320) in current picture 310. The macroblock 320 chosen for this example is in the center of current picture 310, but the same techniques apply to other macroblocks also.

A search window (330) is centered on the macroblock in reference picture 230 that corresponds to the macroblock 320 in current picture 310. That is, if macroblock 320 is centered at (X,Y), then the search window 330 in reference picture 230 is also centered on (X,Y), shown as point 340. Other embodiments position the macroblock in other portions of the reference picture 230, such as the top left. The search window 330 in the example of FIG. 3 extends two pixels past the corresponding macroblock in the horizontal direction, and one pixel in the vertical direction. Therefore, search window 330 contains fourteen different macroblocks: two macroblocks are found one and two pixels, respectively, directly to the left of location 340; another set of two macroblocks is directly to the right of location 340; the remaining sets are found above, below, above-left, above-right, below-left, and below-right of location 340.

The block-matching motion algorithm performed by motion estimator 220 uses sum-of-absolute-differences (SAD) as a criteria for determining similarity (matches) between macroblocks. The sum-of-absolute-differences computes the absolute difference between two pixel values and sums these differences for all pixels in a block, as should be understood to a person of ordinary skill in the art. Motion estimator 220 uses the SAD criteria in conjunction with an inventive method of selecting candidate macroblocks to be tested for similarity, which will now be described.

4. Software Motion Estimation Algorithm: Candidate Macroblock Selection

Motion estimator 220 uses different search methods, depending on whether motion estimator 220 is producing intra-coded motion vectors or inter-coded motion vectors for current picture 310. Motion estimator 220 takes advantage of a priori knowledge about motion in the real world to predict where in search window 330 the matching macroblocks are expected to be, reducing the number of candidate blocks in search window 330 which are actually tested for similarity with macroblock 320 in current picture 310. In the real world, objects typically move with constant acceleration, which means we can expect the movement of objects in a frame (the optical flow) to be smooth and similar (i.e., substantially continuous) both spatially and temporally. Furthermore, the SAD surface (i.e., plot of SAD values over the search space) is expected to relatively smooth (i.e., a relatively small number of local minima).

Using this a priori knowledge is required to direct the searches to where the best matches are expected be found, the algorithm disclosed herein uses reduces the number of searches needing to be performed yet finds good minima. Thus, the algorithm is both computationally efficient and effective at locating good matches.

Figure 4:
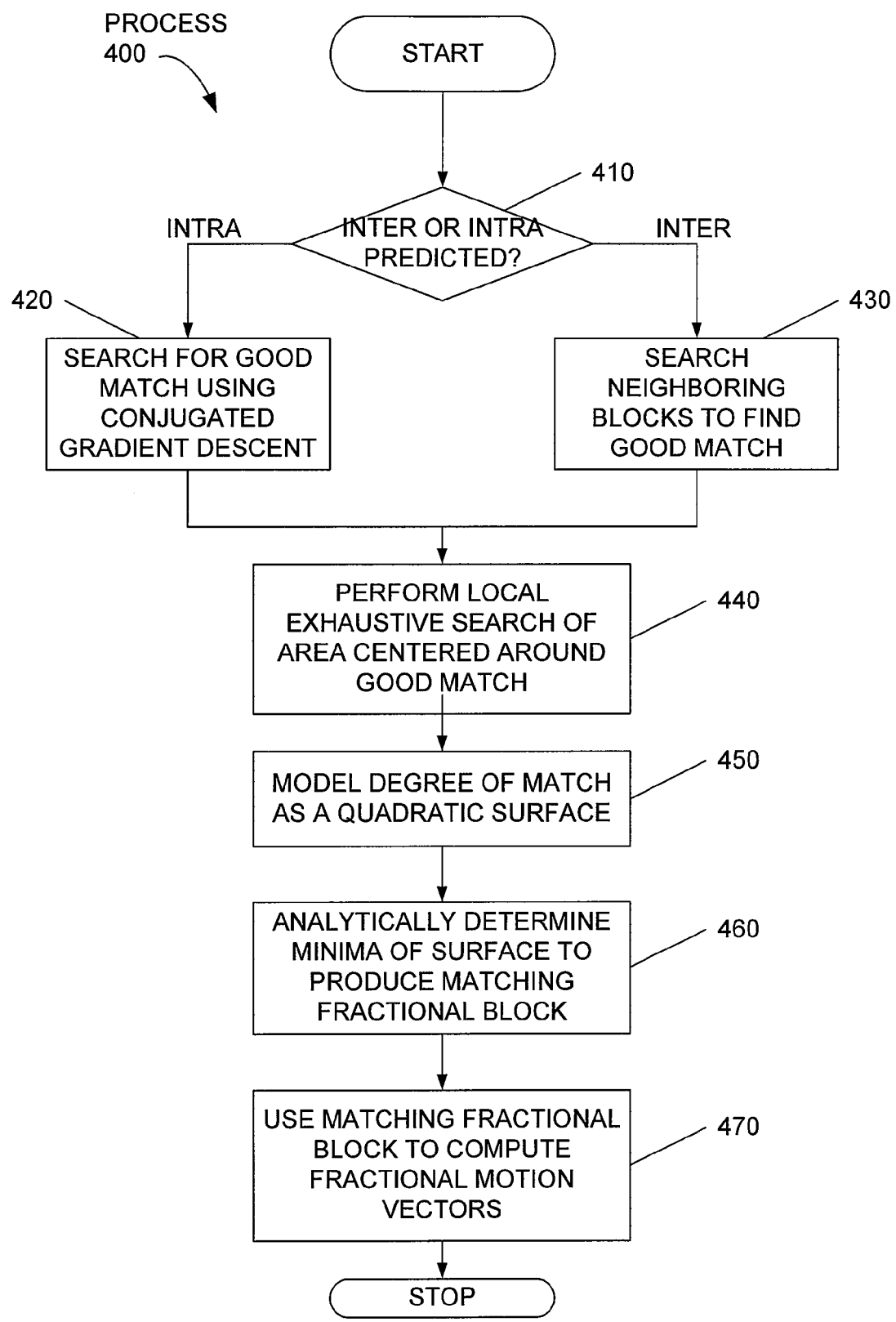
FIG. 4 is a flowchart of the algorithm used by an exemplary embodiment of the motion estimator of FIG. 2.

FIG. 4 is a flowchart of the algorithm used by an exemplary embodiment of motion estimator 220 to compute motion vectors for a current macroblock 320 within current picture 310. The motion estimation process (400) starts at step 410, where it is determined whether the motion vectors produced by motion estimator 220 for current picture 310 will be inter-predicted or intra-predicted. If intra-prediction is used then processing continues at step 420, where a conjugated gradient descent search algorithm is performed to find a prediction macroblock within search window 330 that is a good match with the reference macroblock (current macroblock 320 within current picture 310). The conjugated gradient descent algorithm (step 420) will be further described in connection with FIGS. 5 and 6.

Returning to step 410, if inter-prediction is used to produce motion vectors, then processing continues at step 430, where a "neighboring" or "neighborhood" search is performed. This search includes macroblocks adjacent to current macroblock 320 in current picture 310, and a corresponding macroblock in previously-coded reference picture 230. The neighboring search algorithm (step 430) will be further described in connection with FIGS. 7 and 8.

The conjugated gradient descent algorithm (420) and the neighboring search algorithm (step 430) each identify a good, or acceptable, match from a larger set of candidate prediction macroblocks. A person of ordinary skill in the art should appreciate that the criteria used to determine how a "good match" may be relative or absolute. For example, the neighboring search algorithm described herein uses an absolute criteria: the candidate macroblock with the lowest score is identified as a good match. However, the conjugated gradient descent described herein uses a threshold value, so that the first block with a SAD score below the threshold is identified as a good match. However, the criteria used for the threshold is a design or implementation decision.

After processing step 420 or step 430, a good candidate match has been identified. Step 440 further performs a local area exhaustive search to find the best candidate. The search area is centered around the good candidate macroblock identified by step 420 or step 430. In some embodiments, when performed after conjugate gradient descent 420 (i.e., in the case of intra-prediction) the search area used by local exhaustive search (step 440) includes the four diagonals that are immediately outside of the local minimum (good candidate) identified in the conjugate conjugate descent 420. For example, if the last step value used in the gradient descent was 1, then the search is limited to points at (±1,±1) away from this good candidate. In some embodiments, when performed after neighboring search 430 (i.e., in the case of inter-prediction) the local exhaustive search (step 440) includes candidates in a small region, typically (±2,±2), surrounding the good candidate macroblock.

The local exhaustive search of step 440 narrows from a good candidate macroblock to a best candidate macroblock that is pixel-aligned, i.e., has integral pixel resolution. Steps 450 and 460 find a best candidate macroblock aligned on a fractional-pixel boundary. Conventional fractional motion search algorithms use codec-specific filtering algorithms to interpolate pixel values at fractional locations, based on surrounding integral locations. In contrast, step 450 models the degree of match between the best candidate macroblock and the reference macroblock as a quadratic surface, and then step 460 analytically determines the minimum of this surface. The minimum corresponds to a best matching macroblock but with fractional rather than integral resolution. (This inventive modeling approach to determining the best matching macroblock with fractional resolution will be discussed in more detail in a later section.) After a matching macroblock with fractional resolution is identified at step 450, processing continues at step 470, where a fractional motion vector is computed based on the matching macroblock, using techniques which should be understood by a person of ordinary skill in the art. The process 400 is then complete.

A person of ordinary skill in the art should appreciate that the above algorithm is inherently sequential since it uses neighborhood information. Although conventional designs that use hardware acceleration often avoid sequential algorithms, a sequential design is appropriate here for several reasons. First, the pixel data is read in a sequential raster fashion, hence can be prefetched, and a circular buffer maintained. Second, in embodiments that include a single SAD acceleration unit, performance is constrained not by the sequential processing, but by the ability to keep the unit fully utilized. The SAD acceleration unit can be kept busy provided there are not many cache misses for the predicted blocks. Since the miss rate is a function of cache size, and an HDTV resolution image requires only 1920/8=<1 KB motion vectors in the cache, a low cache miss rate can be expected.

5. Intra-Predicted Motion Vectors Using Conjugate Gradient Descent

Figure 5:
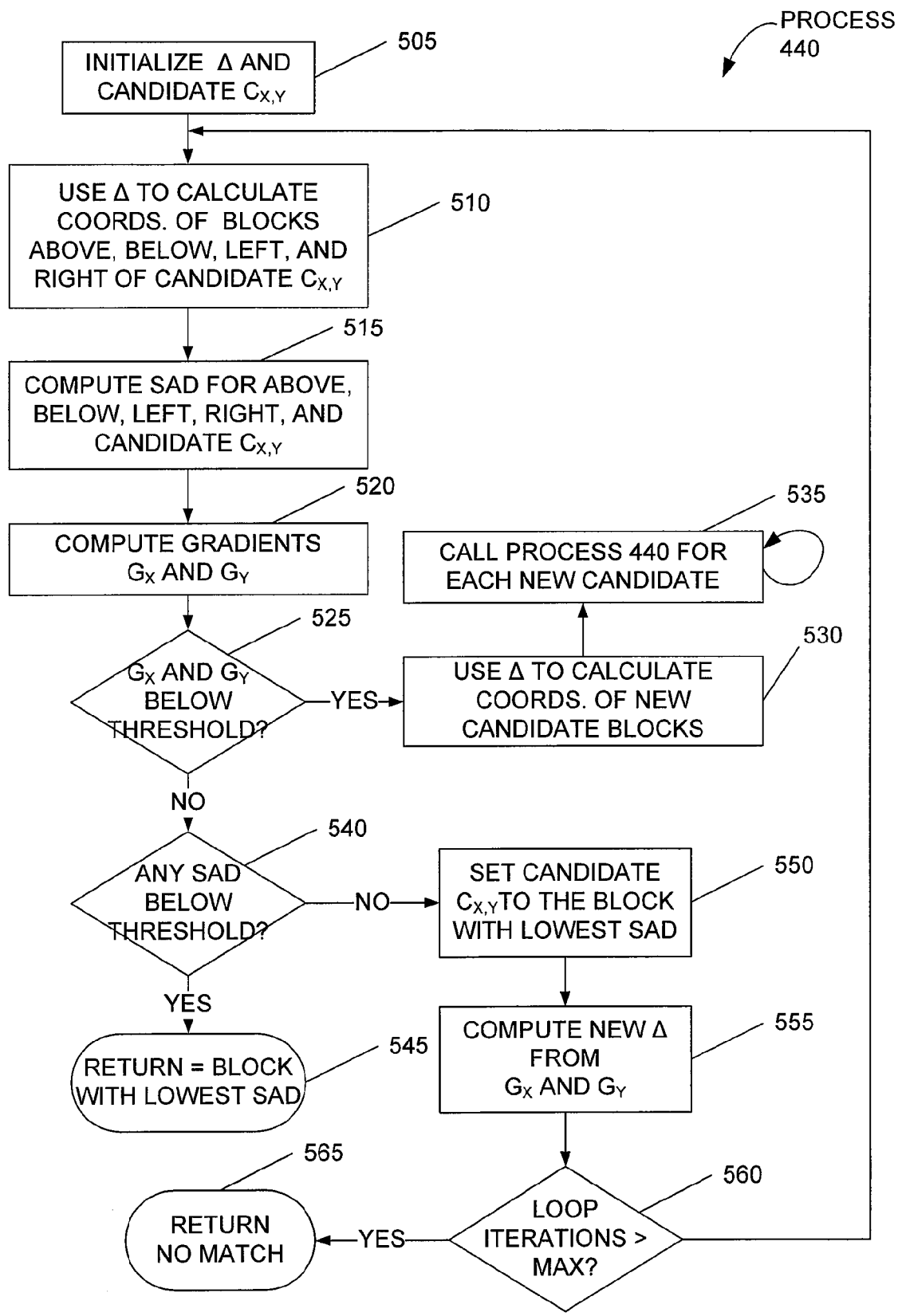
FIG. 5 is flowchart of one embodiment of the conjugated gradient descent process from FIG. 4.

FIG. 5 is a flowchart of the conjugated gradient descent process 440 from FIG. 4, performed by one embodiment of motion estimator 220. As described earlier, this process 440 is performed after determining that intra-prediction will be used to find a macroblock within search window 330 that is a good (i.e., acceptable) match with current macroblock 320. SAD scores are computed for a set of 5 initial candidates: the current macroblock, and macroblocks that are above, below, to the right and to the left of the current macroblock, separated by a fixed distance. From this initial set of five SAD values, two sets of gradients are computed which are perpendicular to each other. From these two sets of gradients, the direction of steepest gradient is obtained. If the gradients are relatively shallow, or the five initial candidate macroblocks have very similar SAD scores, then the search is expanded further away from the current macroblock, since these conditions indicate that a good local minima probably does exist within this region. Having given an overview of the conjugated gradient descent process 440, the process will now be explained in more detail.

The process begins at step 505, where a candidate block $C_{x,y}$ and step values $\Delta_x$ and $\Delta_y$ are initialized. In one embodiment, candidate macroblock $C_{x,y}$ is set to the top-left of search window 330, and step values $\Delta_x$ and $\Delta_y$ are both set to a small integer value such as 8. Next, at step 510, the coordinates of four candidate macroblocks surrounding candidate macroblock $C_{x,y}$ are computed. These four candidate macroblocks are above, to the right, below, and to the left of candidate macroblock $C_{x,y}$. That is, $$T = (C_x, -\Delta_y + C_y);$$
$$R = (\Delta_x + C_x, C_y);$$
$$B = (C_x, \Delta_y + C_y);$$
$$L = (-\Delta_x + C_x, C_y)$$

Processing continues at step 515, where the sum of absolute differences (SAD) is computed for each of the five candidate macroblocks (the original and the four surrounding macroblocks). At step 520, gradients $g_x$ and $g_y$ are computed. Gradient $g_x$ is the difference between the SAD of the Left and Right candidate macroblocks. Gradient $g_y$ is the difference between the SAD of the Top and Bottom candidate macroblocks. Thus, the gradients indicate whether the amount of error between potential matching macroblocks is increasing or decreasing in an x or y direction. At step 525, the gradients are compared to threshold values. If the gradients are below the threshold (i.e., the gradient is relatively shallow), this indicates that no local minima exist in the current search area, so the search is expanded to include new candidate macroblocks. These new candidate macroblocks are farther from the original candidate processing macroblock $C_{x,y}$. In some embodiments, the search is also expanded if the SAD scores computed at step 515 for the candidate macroblocks are similar. The expanded search continues at step 530, where coordinates of four new candidate macroblocks are computed. Where the original four candidate macroblocks were directly to the left, right, top, and bottom of $C_{x,y}$ at a distance of $(\Delta_x, \Delta_y)$, the four new candidate macroblocks are chosen to form corners of a square surrounding the original candidate macroblock $C_{x,y}$, at a distance of $(\Delta_x, \Delta_y)$:

$$TL = (-\Delta_x + C_x, -\Delta_y + C_y);$$
$$TR = (\Delta_x + C_x, \Delta_y + C_y);$$
$$BL = (-\Delta_x + C_x, C_y);$$
$$BR = (\Delta_x + C_x, \Delta_y + C_y)$$

At step 535, the same conjugated gradient descent process 440 is then performed on each of these new candidate macroblocks (C,TL,TR,BL,BR).

Returning to the gradient comparison of step 525, if the gradients computed at macroblock 520 are at or above the threshold (i.e., the gradient is relatively steep), then at step 540 the SAD scores computed at step 515 are compared to a threshold. If the SAD scores are below the threshold, then a good match has been found, and process 440 returns (at step 545) to the caller, providing the caller with the candidate macroblock that has the lowest SAD score.

If the SAD scores tested at macroblock 540 are at or above the threshold, a match has not yet been found so the search area is adjusted. At step 550, a new center candidate macroblock $C_{x,y}$ is selected. The new center macroblock is the macroblock in the candidate set C,TL,TR,BL,BR that has the lowest SAD as computed in step 515. Next, at step 555, new values for step values $\Delta_x$ and $\Delta_y$ are computed from gradients $g_x$ and $g_y$, for example $\Delta_x = \Delta_x \times g_x$. A steep gradient indicates that an acceptable matching macroblock is expected to be located farther away from the current center candidate, so $(\Delta_x, \Delta_y)$ would increase. Conversely, a shallow gradient indicates that an acceptable match is expected to be closer to the current center candidate, $(\Delta_x, \Delta_y)$ would decrease. A person of ordinary skill in the art should understand that various scaling factors may be used to compute $(\Delta_x, \Delta_y)$ from the gradients to achieve this result.

Next, the number of loop iterations is tested in step 560. If the number of iterations is more than a maximum value, then the process 440 completes at step 565, having found no acceptable match. Otherwise, having used the error gradient to select a new set of candidate macroblocks which are expected to be closer to an eventual match, the gradient descent process 440 returns to step 510 where this new set is processed. The conjugated gradient descent process 440 completes when either an acceptable match is found (at step 545) or a maximum number of iterations has occurred with no match (step 565).

Figure 6:
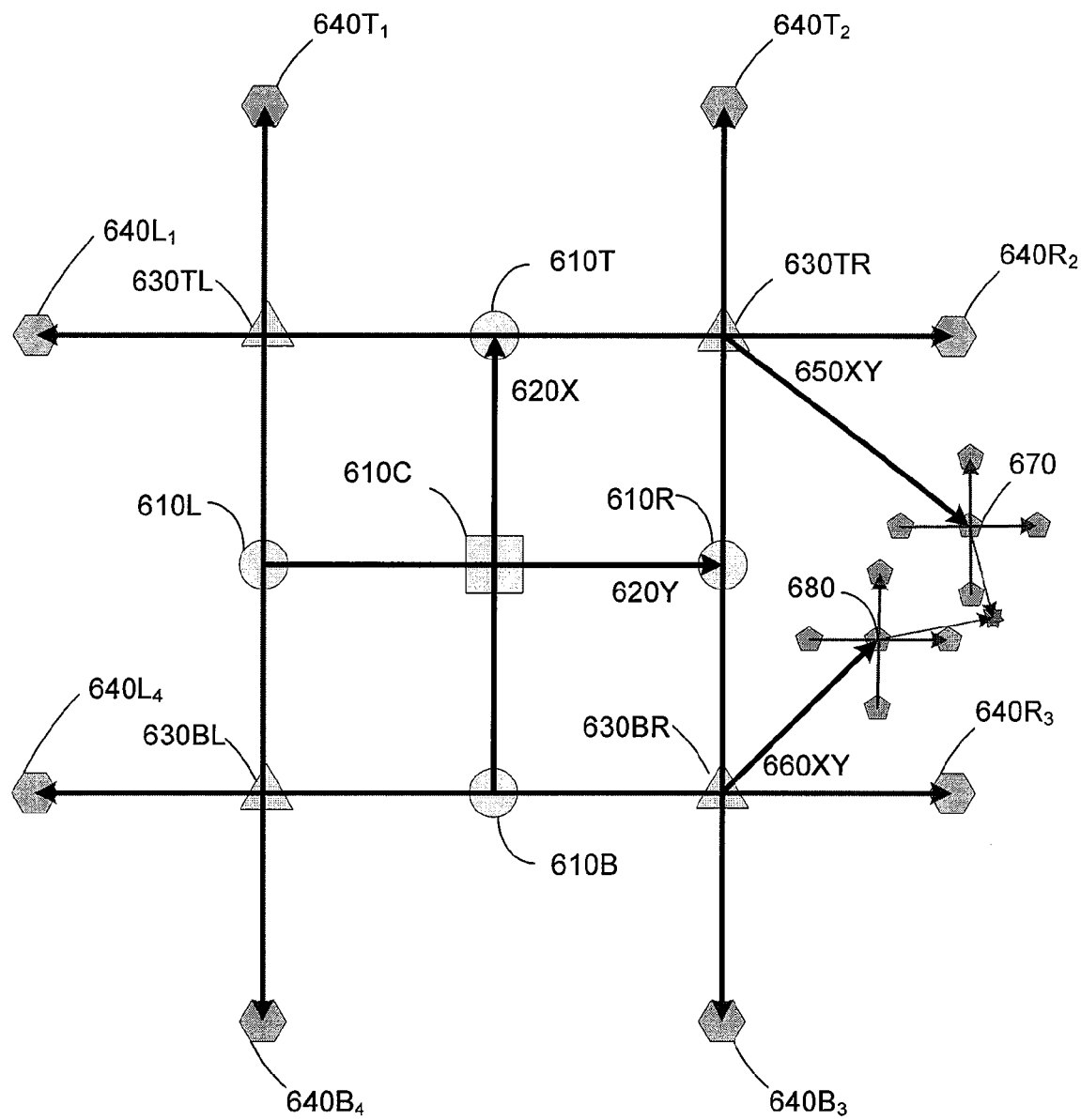
FIG. 6 illustrates an example scenario that uses the conjugated gradient descent process of FIG. 5.

FIG. 6 illustrates an example scenario that uses the conjugated gradient descent process 440. The initial candidate macroblock $C_{x,y}$ is the square (610C), and the four surrounding candidates are the circles (610T, 610L, 610R, 610B). From these initial candidates the gradients $g_x$ and $g_y$ (620X, 620Y) are computed. In this example scenario, the gradients were too shallow and no computed SAD score was below the threshold. Therefore, the search is expanded, using the four new center candidate macroblocks shown as triangles (630TL, 630TR, 630BL, 630BR). These new center candidate macroblocks form the corners of a square surrounding the original candidate macroblock $C_{x,y}$, at a distance of $\Delta$.

From each of these center candidates, the surrounding macroblocks shown as hexagons (640L$_1$, 640T$_1$, 640T$_2$, 640R$_2$, 640L$_3$, 640B$_3$, 640B$_4$, 640R$_4$) are selected as candidates. In this example scenario, two of the candidates 640 had SAD values below the threshold and "steep" gradients (650XY, 660XY). Another candidate is selected based on each of the "steep" gradients: candidate 670 is based on gradient 650XY, and candidate 680 is based on gradient 660XY. The gradient descent search continues using these new candidates 670 and 680, according to conjugated gradient descent process 440.

a. Inter-Predicted Motion Vectors Using Previous Neighbors

Figure 7:
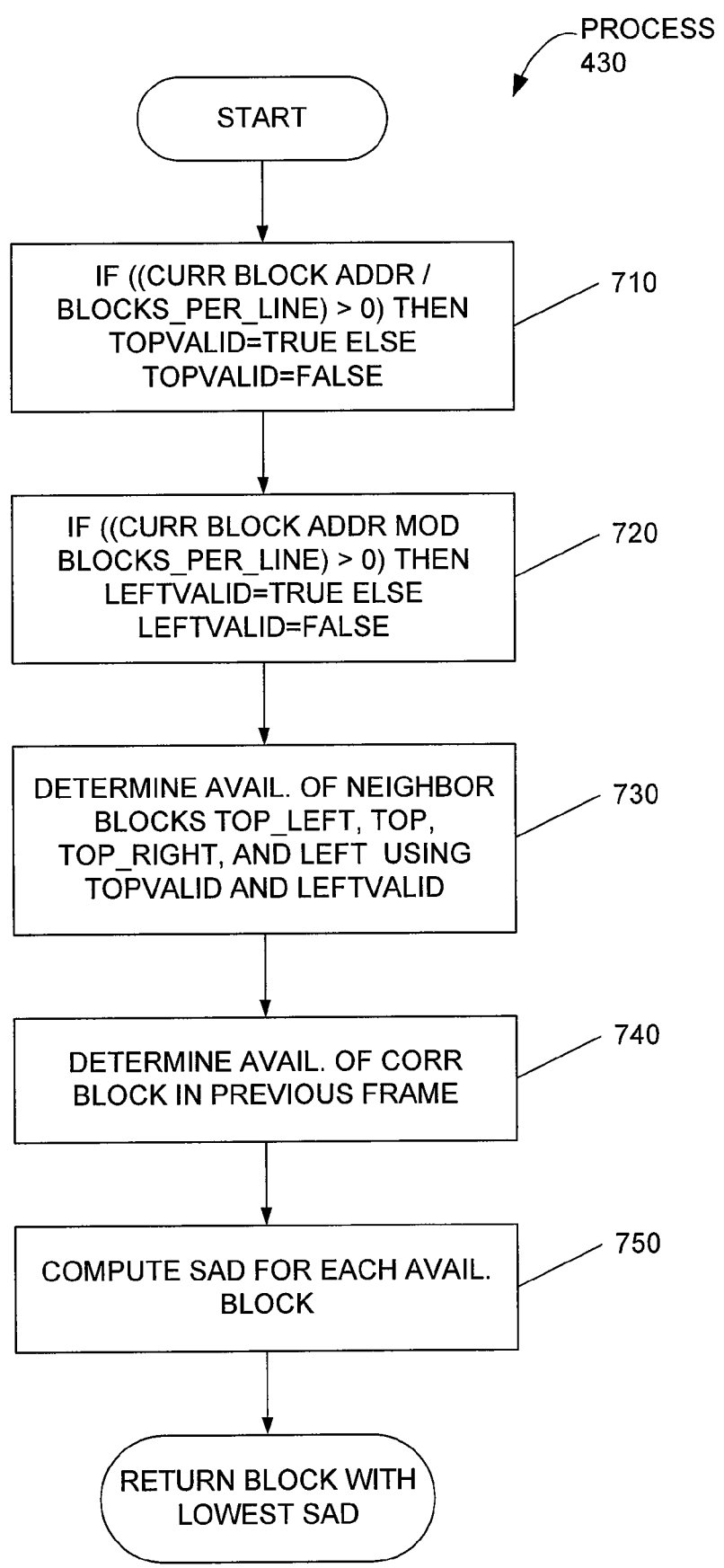
FIG. 7 is a flowchart of one embodiment of the neighboring search algorithm from FIG. 4.
Figure 8:
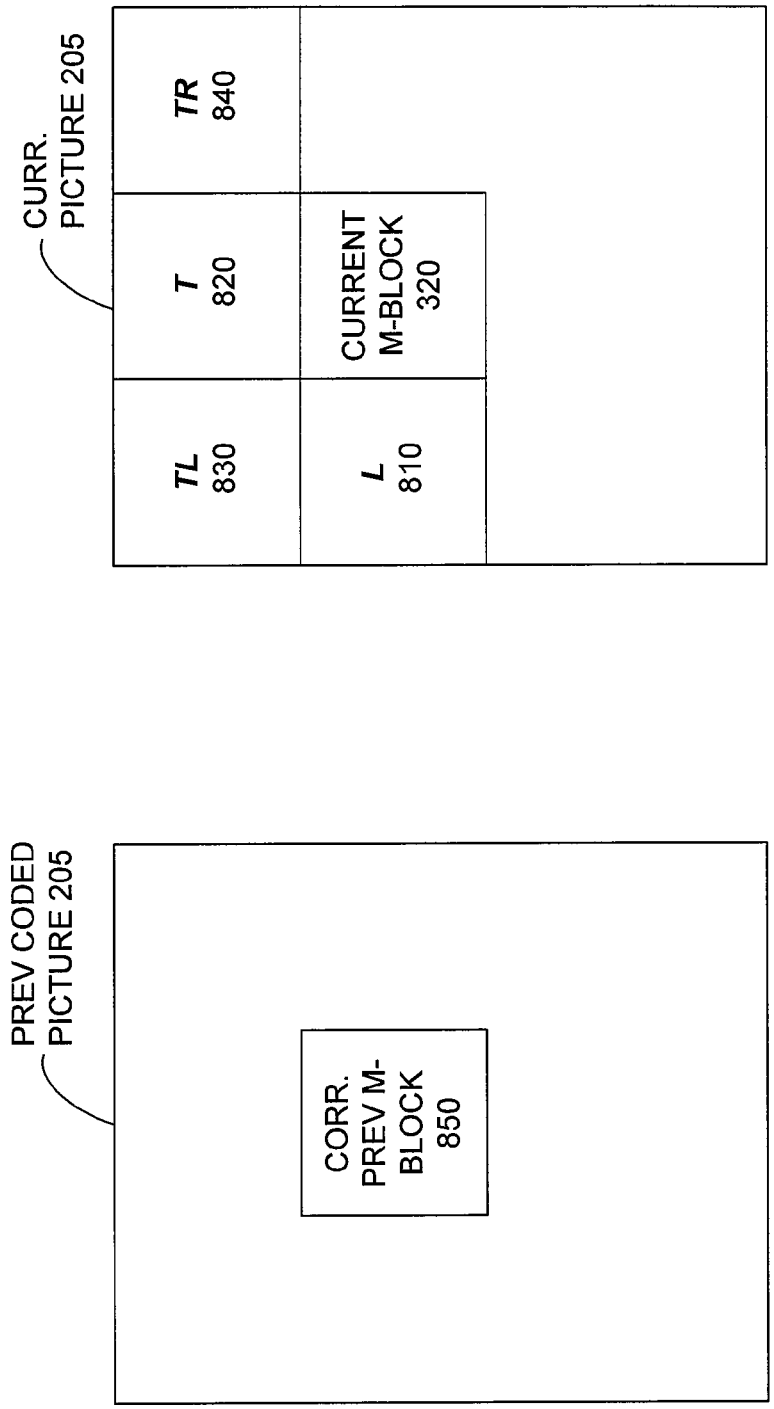
FIG. 8 illustrates relative positioning of five candidate macroblocks as used by the neighboring search algorithm from FIG. 7.

FIG. 7 is a flowchart of the neighboring search algorithm (step 430) from FIG. 4, performed by one embodiment of motion estimator 220. As discussed earlier, candidate macroblocks for this search include macroblocks adjacent to current macroblock 320 in current picture 310 which have already been coded. Also included as a candidate is a corresponding macroblock in previously-coded reference picture 230.

The process of computing coordinates of the candidate macroblocks begins with step 710, where a flag variable TopValid is computed by taking the modulus (remainder) of the address of current macroblock 320 and the number of macroblocks per line. If this modulus is non-zero, then TopValid is True, otherwise TopValid is false. At step 720, a flag variable LeftValid is computed by an integer division of the address of current macroblock 320 and the number of macroblocks per line. If this divisor is non-zero, then LeftValid is True, otherwise LeftValid is false. These TopValid and LeftValid variables indicate whether a neighbor macroblock is available to the left of and above current macroblock 320, respectively, taking into account the top and left edge of the macroblock.

At step 730, the TopValid and LeftValid variables are used in combination to determine the availability, or existence, of four candidate macroblocks adjacent to current macroblock 320. Specifically: a Left macroblock L is available if (LeftValid); a Top macroblock T is available if (TopValid); a TopLeft macroblock TL is available if (TopValid && LeftValid); and a TopRight macroblock TR is available if (TopValid && RightValid). Next, at step 740, availability is determined for a candidate Previous macroblock P, which is a macroblock in previously-coded reference picture 230 that corresponds spatially to current macroblock 320. The relative positioning of these five candidate macroblocks can be seen in FIG. 8, where L is 810, T is 820, TL is 830, TR is 840, and P is 850.

Returning to FIG. 7, steps 730 and 740 determine how many candidate macroblocks are available for comparison (anywhere from 1 to 5). Step 750 computes a SAD for each available candidate macroblock. If all five candidates are available the set of SAD values is given by:

$$\left\{0, L, T, P, \left(\frac{L+T}{2}\right), med(L, T, TL),\right.$$
$$\left.\left(\frac{L+med(T, TL, TR)}{2}\right), med(T, TL, TR)\right\}$$

If certain candidates are not available, a person of ordinary skill in the art should understand that the set of candidates is correspondingly smaller. The process 430 then completes, returning as a match the candidate macroblock with the lowest SAD.

As discussed earlier in connection with FIG. 4, once a matching macroblock has been found (using either the neighboring search of FIG. 7 or the conjugated gradient descent of FIG. 5) then the search area is further narrowed with a local exhaustive search (440 in FIG. 4). After the local search, a fractional motion vector is computed (in FIG. 4) using the results of the local exhaustive search. The computation of the fractional motion vector will now be discussed in further detail.

6. Fractional Motion Vector Computation Using a Quadratic Surface Model

A person of ordinary skill in the art should be familiar with graphing the degree of match between macroblocks against the search window to produce an "error surface". Using an inventive approach, motion estimator 220 models the error surface with a quadratic surface, and analytically determines the minima in the surface with sub-pixel accuracy. Motion estimator 220 first determines the minima in one direction, giving rise to a minima line. Motion estimator 220 then determines the minima along this line for the perpendicular direction.

The general equation for a quadratic curve is given in Equation 1.

$$y = C_1 + C_2 t + C_3 t^2 \qquad \text{Equation 1.}$$

The derivative of the curve is taken, giving Equation 2:

$$\frac{\delta y}{\delta t} = C_2 + 2C_3 t \Rightarrow t = \frac{-C_2}{2C_3} \qquad \text{Equation 2}$$

Once coefficients $C_1$, $C_2$, and $C_3$ are known, Equation 2 can be solved to determine t, the minima position. Motion estimator 220 solves Equation 3 to determine the coefficients $C_1$, $C_2$, and $C_3$.

$$\begin{pmatrix} C_1 \\ C_2 \\ C_3 \end{pmatrix} = \frac{1}{4} \begin{pmatrix} 31 & -27 & 5 \\ -27 & 25 & -5 \\ 5 & -5 & 1 \end{pmatrix} \times \begin{pmatrix} \sum_{i=1}^{4} d_i \\ \sum_{i=1}^{4} d_i t_i \\ \sum d_i t_i^2 \end{pmatrix} \qquad \text{Equation 3}$$

Motion estimator 220 uses the 8×4 SAD instruction provided by GPU 120 to efficiently compute Equation 3. Each $d_i$ represents a SAD score, and the summation over i represents SAD scores for macroblocks which are adjacent in the x direction. As discussed in further detail in connection with FIG. x, the 8×4 SAD instruction efficiently computes the four SAD values for adjacent macroblocks (x,y), (x+1,y), (x+2,y) and (x+3, y), i.e., i=0 . . . 3, and when i=j, t=j+1. As discussed earlier, once the coefficients are known, solving Equation 2 gives t, the minima position in the x direction.

Equation 3 can also be used to determine the minima for t in the vertical direction. In this case, motion estimator 220 uses the 8=4 SAD instruction to efficiently compute the four SAD scores for vertically adjacent blocks (x,y), (x,y+1), (x,y+2) and (x,y+3). Equation 3 gives the coefficients $C_1$, $C_2$ and $C_3$ computed from these SAD scores. As discussed earlier, once the coefficients are known, solving Equation 2 gives t, the minima position in the y direction.

The quadratic error surface approach used by motion estimator 220 improves on the conventional approach, which uses a computationally expensive filter to find a good match on a sub-pixel boundary after first determining a good match on a pixel boundary. The inventive approach used by motion estimator 220 can also be adjusted for different degrees of sub-pixel resolution, e.g., half-pel and quarter-pel, rather than requiring a different filter for different pixel resolutions.

7. Using SAD Acceleration in GPU to Efficiently Compute Minima

As described earlier, motion estimator 220 determines which macroblock in a predicted picture is a good match with a reference macroblock in the current picture, where the criteria used is a sum-of-absolute-differences (SAD). Motion estimator 220 uses SAD hardware acceleration provided by GPU 120 that is exposed as a GPU instruction. The SAD instruction takes as input a 4×4 reference block and an 8×4 predicted block, and produces as output 4 SAD scores. The size of the reference block and predicted block may be varied depending on the needs. The 4×4 reference block and the 8×4 predicted block are merely used as an example to illustrate embodiments of the invention, and shall not limit the size of the reference block and the predicted block.

Figure 9A:
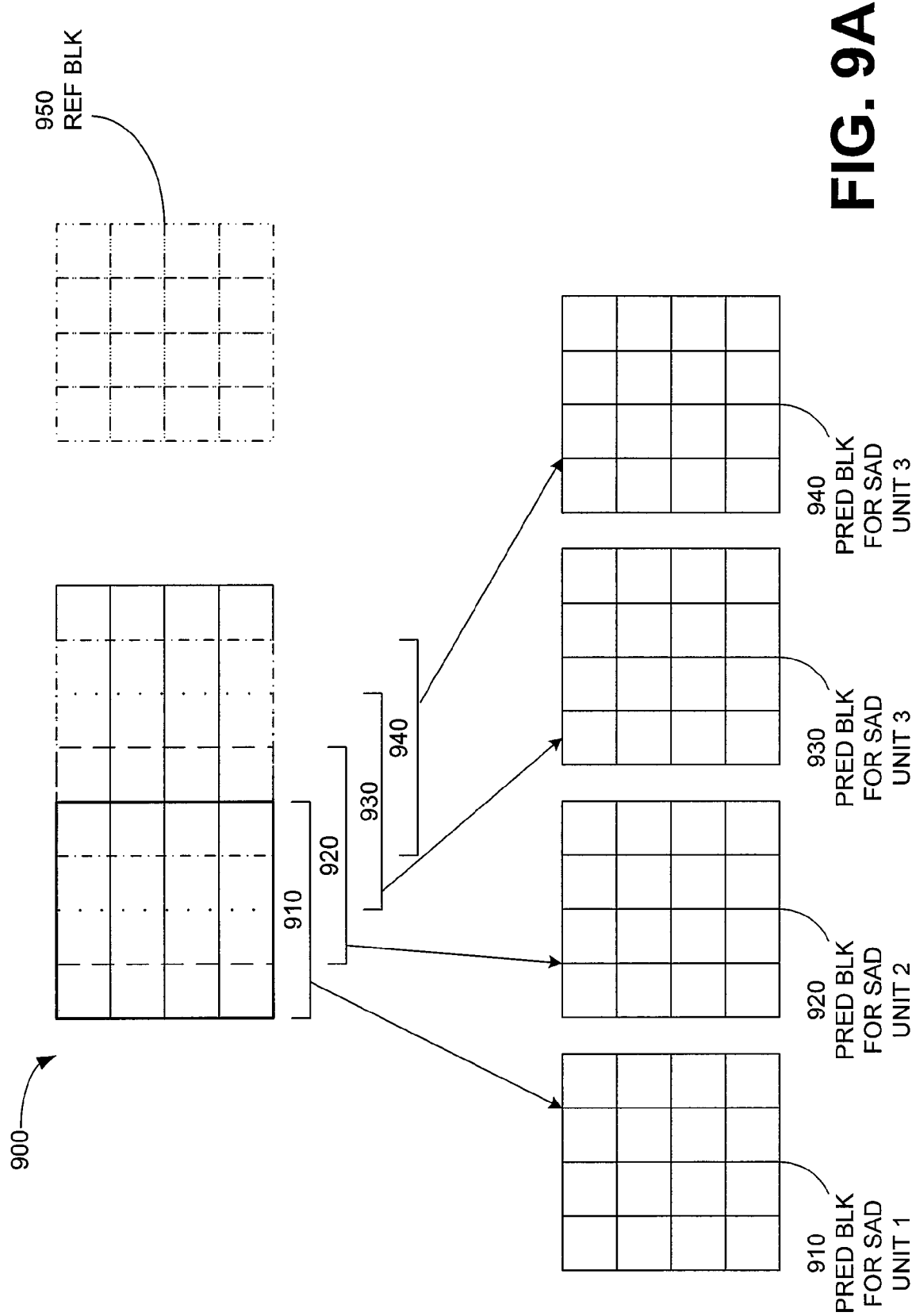
FIGS. 9A and 9B are block diagrams illustrating the operation of the SAD instruction on the reference and prediction blocks.
Figure 9B:
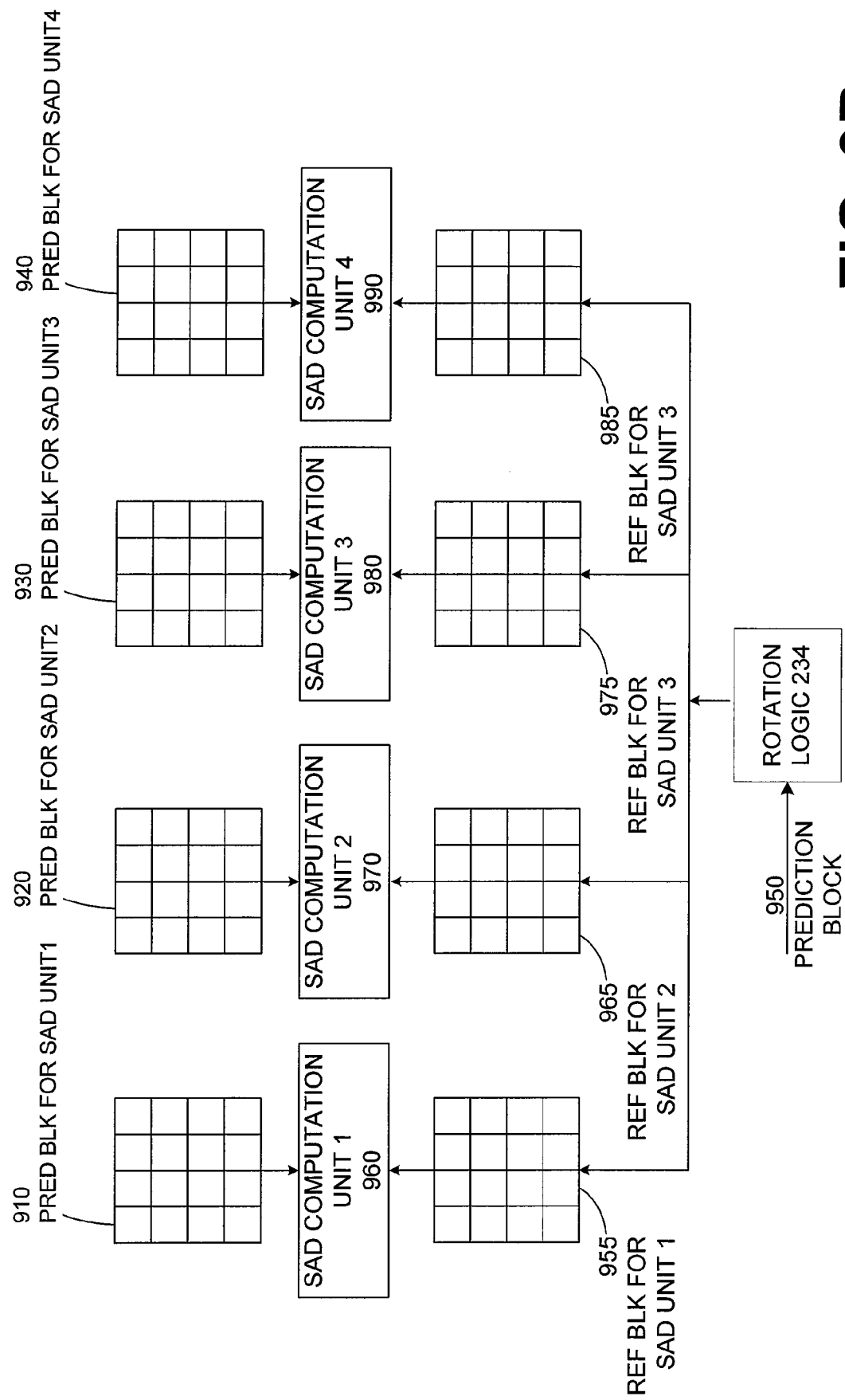

FIGS. 9A and 9B are block diagrams illustrating the operation of the SAD instruction on the reference and prediction blocks. As shown in FIG. 9A, the 8×4 prediction block is composed of multiple horizontally adjacent 4×4 blocks which overlap each other, shown as blocks 910, 920, 930, and

940. The SAD acceleration unit takes the single input 4×4 reference block 950 and computes a SAD score that is relative to each of the 4×4 reference blocks 910-940. That is, the SAD instruction computes four scores: one score is the sum-of-absolute-differences between block 910 and block 950; another score is the sum-of-absolute-differences between block 920 and block 950; another score is the sum-of-absolute-differences between 930 and block 950; and yet another score is the sum-of-absolute-differences between 940 and block 950.

Turning to FIG. 9B, the SAD acceleration unit within GPU 120 uses four SAD computation units (960, 970, 980, 990) to implement the SAD instruction. SAD computation unit 960 is provided with the leftmost 4×4 block 910. Input to SAD computation unit 970 is the next 4×4 block to the right (920). Input to SAD computation unit 980 is the next 4×4 block to the right (930). Finally, SAD computation unit 990 is provided with the rightmost 4×4 block (940). GPU 120 uses the individual SAD computation units in parallel, so that the SAD instruction produces four SAD scores every clock. A person of ordinary skill in the art should understand the algorithm used for the SAD computation of two same-size pixel blocks, and the design of a hardware unit to perform this computation, so these details will not be discussed further.

The 4×4 reference block is both horizontally and vertically aligned on a pixel boundary. However, there is no requirement that the 4×4 prediction blocks 910-940 are vertically aligned. In one embodiment, the data is aligned vertically by rotating (logic 995) the reference block. Rotating the reference block rather than each of four prediction blocks saves gate count. The rotated reference block is then provided to each of individual SAD hardware accelerator units. Each unit produces a 12-bit score, and the scores are combined into a single 48-bit output. In one embodiment, the order of the scores is based on the U texture coordinate of the prediction block (lowest coordinate in the lowest bit position).

The code below illustrates that the SAD score for an 8×8 block—i.e., two adjacent 8×4 blocks—can be computed using only four SAD instructions. Registers T1, T2, T3, and T4 are used to hold the 4 SAD scores. Variable sadS is used to accumulate the sum of the SAD scores. The address of the 8×4 reference block is assumed to be in refReg. U and V are the texture coordinates of the 8×8 prediction block. The following code produces a total SAD score, stored in sadS, for the entire 8×8 block.

| SAD | T1, refReg, U, V | ; left-top of 8x8 prediction block |
| SAD | T2, refReg, U+4, V | ; right-top of 8x8 prediction block |
| ADD | sadS, T1, T2 | |
| SAD | T3, refReg, U, V+4 | ; left-bottom of 8x8 prediction block |
| ADD | sadS, sadS, T3 | |
| SAD | T4, refReg, U+4, V+4 | ; right-bottom of 8x8 prediction block |
| ADD | sadS, sadS, T4 | |

However, computing and summing all four sub-block SAD values can usually be avoided, since the computation can be stopped as soon as the sum exceeds the current minimum. The following pseudocode illustrates how the SAD instruction can be used in a loop which terminates when the sum reaches a minimum.

```
I := 0;
SUM := 0;
MIN = currentMIN;
WHILE ( I < 4 || SUM < MIN)
    SUM := SUM + SAD(refReg, U+(I%2)*4, V+ (I>>1)*4);
```

IF (SUM < currMIN) currMIN = MIN;
Go to Next Search point;

This 8×4 SAD instruction in GPU 120 is used directly by the novel search algorithm of motion estimator 220, for example in performing a local exhaustive search. Also, texture cache 1060 (FIG. 10) is block aligned, while the algorithm used by motion estimator 220, as described above, is pixel aligned. Although multiplexer units could be added to GPU 120 to handle this alignment difference, doing so would increase gate count and power usage. Instead, GPU 120 uses this budget to provide not one, but 4 SAD units. In some embodiments, the 8×4 SAD instruction provides an advantage in efficiently computing minima (Equation 4), which involves computing SAD scores for adjacent blocks. In some embodiments, the 8×4 SAD instruction provides another advantage in the exhaustive search (block 440), which calculates SAD values for diagonals when the step value is 1.

8. Graphics Processor: Command and Data Flow

Having discussed the software algorithm implemented by motion estimator 220, and the use of the 8×4 SAD instruction in GPU 120 by this algorithm, details of the GPU 120 and the SAD instruction will now be discussed.

Figure 10:
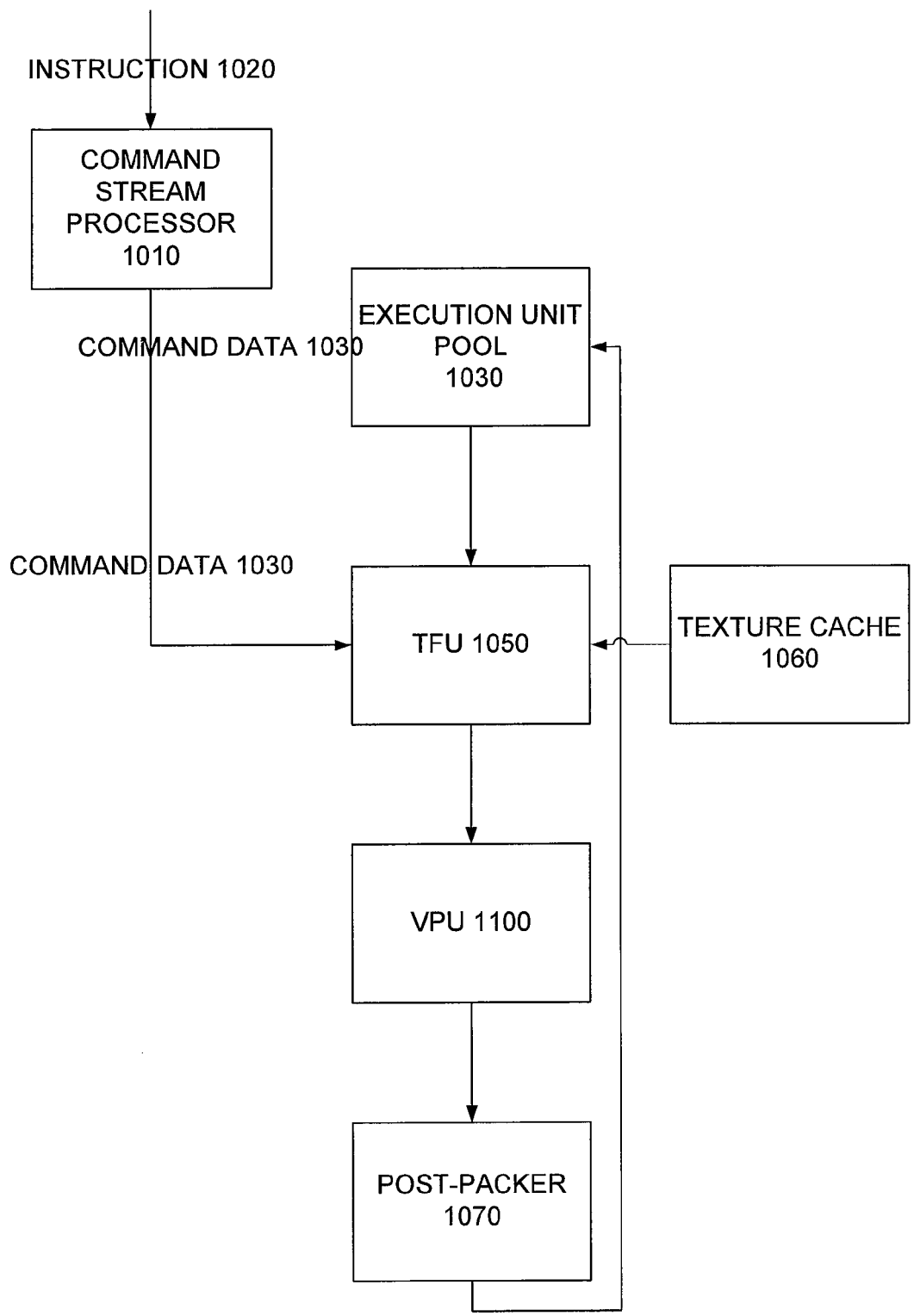
FIG. 10 is a data flow diagram for one embodiment of the GPU of FIG. 1.

FIG. 10 is a data flow diagram for GPU 120, in which command flow is shown by arrows on the left portion of FIG. 10, and flow of image or graphics data is shown by arrows on the right. Omitted from FIG. 10 are a number of conventional components, known to those skilled in the art, that are unnecessary to explain the motion estimation features of GPU 120.

A command stream processor 1010 receives an instruction 1020 over a system bus (not shown) and decodes the instruction, producing command data 1030, such as vertex data. GPU 120 supports conventional graphics processing instructions, as well as instructions which accelerate video encoding and/or decoding such as the 8×4 SAD instruction discussed earlier.

Conventional graphics instructions involve tasks such as vertex shading, geometry shading, and pixel shading. For this reason, command data 1030 is supplied to a pool (1040) of shader execution units. Shader execution units make use of a texture filter unit (TFU) 1050 as needed, for example, to apply a texture to a pixel. Texture data is cached in texture cache 1060, which is backed by main memory (not shown).

Some instructions are passed to video processing unit (VPU) 150, whose operation will be described below. Data produced by is further processed by post-packer 1070, which compresses the data. After post-processing, data produced by VPU 150 is provided to execution unit pool 1040.

Execution of video encode/decode acceleration instructions such as SAD instruction differs in several respects from execution of conventional graphics instructions as described above. First, video acceleration instructions are executed VPU 150, rather than by shader execution units. Second, video acceleration instructions do not use texture data, per se.

However, both the image data used by video acceleration instructions and the texture data used by graphics instructions are two-dimensional arrays. GPU 120 takes advantage of this similarity, using TFU 1050 to load image data for VPU 150, thus allowing texture cache 1060 to cache some of the image data operated on by VPU 150. For this reason, VPU 150 is located as shown in FIG. 10, between TFU 1050 and post-packer 1070.

TFU 1050 examines command data 1030 extracted from instruction 1020. Command data 1030 further provides TFU 1050 with coordinates of the desired image data within main memory (not shown). In one embodiment, these coordinates are specified as U,V pairs, which should be familiar to a person of ordinary skill in the art. When instruction 1020 is a video acceleration instruction, the extracted command data 1030 further instructs TFU 1050 to bypass any texture filters (not shown) within TFU 1050. Thus, TFU 1050 is leveraged for video acceleration instructions to load image data for VPU 150.

In this manner, TFU 1050 is leveraged for video acceleration instructions to load image data for VPU 150. VPU 150 receives image data from TFU 1050 in the data path, and command data 1030 from the command path, and performs an operation on the image data according to command data 1030. The resulting image data output by VPU 150 is fed back to execution unit pool 1040, after further processing by post-packer 1070.

9. GPU: Instruction Parameters

The operation of VPU 150 in executing the SAD video acceleration instruction will now be described. As explained earlier, each GPU instruction is decoded and parsed into command data 1030, which can be viewed as a set of parameters specific to each instruction. The parameters for the SAD instruction are shown in Table 1.

TABLE 1

Parameters for VPU SAD Instruction

| Input/Output | Name | Size | Comments |
|---|---|---|---|
| Input | FieldFlag | 1-bit | If FieldFlag == 1 then Field Picture, else Frame Picture |
| Input | TopFieldFlag | 1-bit | If TopFieldFlag == 1 then Top-Field-Picture, else Bottom-Field-Picture if FieldFlag is set. |
| Input | PictureWidth | 16-bit | e.g., 1920 for HDTV |
| Input | PictureHeight | 16-bit | e.g., 1080 for 30 P HDTV |
| Input | BaseAddress | 32-bit unsigned | Prediction Picture Base Address |
| Input | BlockAddress | U: 16-bit signed V: 16-bit signed | Prediction Picture Texture Coordinates (relative to Base Address) In SRC1 Opcode SRC1[0:15] = U, SRC1[31:16] = V U, V in 13.3 format, with fractional part ignored |
| Input | RefBlock | 128-bit | Reference Picture Data In SRC2 Opcode |
| Output | Destination Operand | 4x16-bit | Least significant 32-bit of 128-bit register In DST Opcode |

Several input parameters, used in combination, determine the address of the 4×4 block to be fetched by TFU 1050. The BaseAddress parameter points to the start of the texture data within the texture cache. The top-left coordinate of the block within this region is given by the BlockAddress parameter. The PictureHeight and PictureWidth input parameters are used to determine the extent of the block, i.e., the bottom-left coordinates. Finally, the video picture may be progressive or interlaced. If interlaced, it consists of two fields (top and bottom fields). The TFU 1050 uses the FieldFlag and TopFieldFlag to properly handle interlace images.

10. GPU: Transformation of Image Data

To execute the SAD instruction, VPU 150 fetches input pixel blocks from TFU 1050 and performs a transformation on the blocks, into a format suitable for processing by SAD acceleration units 960-990. The pixel blocks are then provided to the SAD acceleration units 960-990, which return SAD scores. The individual SAD scores are then accumulated into a destination register. These functions will now be described in further detail.

VPU 150 receives two input parameters specifying the 8×4 blocks for which SAD scores are to be computed. The data for the reference block is specified directly in the SRC2 opcode: an 8×4×8-bit block is given as 128 bits of data. In contrast, the SRC1 opcode specifies the address of the prediction block rather than data. VPU 150 provides this address to TFU 1050, which fetches the 128 bits of prediction block data from texture cache 1060.

Although image data contains luminance (Y) and chrominance (Cr, Cb) planes, motion estimation typically uses only Y components. Therefore, when executing the SAD instruction, the pixel blocks operated on by VPU 150 contain only Y components. In one embodiment, VPU 150 generates an inhibit signal which instructs TFU 1050 not to fetch Cr/Cb pixel data from texture cache 1060.

Figure 11:
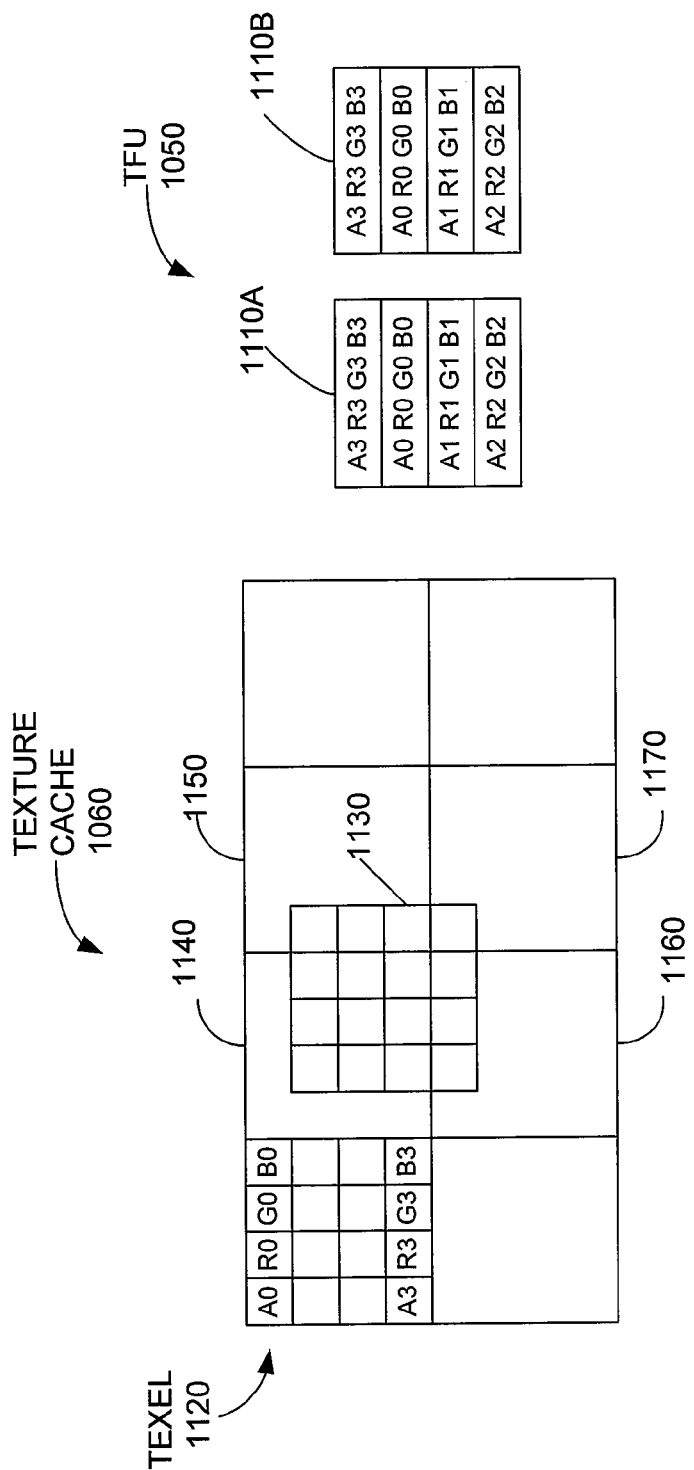
FIG. 11 is a block diagram of the texture filter unit and texture cache from FIG. 10.

FIG. 11 is a block diagram of TFU 1050 and texture cache 1060. TFU 1050 is designed to fetch from texture cache 1060 on a texel boundary, and to load 4×4 texel blocks from texture cache 1060 into filter input buffers 1110. When fetching data on behalf of VPU 150, a texel (1120) is treated as four channels (ARGB) of 32-bits each, for a texel size of 128 bits. When fetching data for the SAD instruction, TFU 1050 loads an 8×4×8-bit block, which is stored in two pixel input buffers (1110A and 1110B). The use of 8×4 image blocks by the SAD instruction was described earlier in connection with FIG. 9.

Image data used by VPU 150 may be byte-aligned. However, TFU 1050 is designed to fetch from the cache on a texel boundary. Therefore, when fetching data for VPU 150, TFU 1050 may need to fetch up to four texel-aligned 4×4 blocks that surround a particular byte-aligned 8×4 block.

This process can be seen in FIG. 11, where the block to be fetched (target block 1130) is not aligned on a texel boundary, in either the horizontal or the vertical direction. The U,V address of target block 1130 specifies the top left corner of an 8×4-8-bit, byte-aligned block. In this example, TFU 1050 fetches texels 1140, 1150, 1160 and 1170 in order to obtain target block 1130. TFU 1050 then combines selected bitwise rows and columns from blocks 1140-1170, so that the leftmost 4×4 bits of target block 1130 are written to filter buffer 1110A. Similarly, TFU 1050 combines selected bitwise rows and columns from blocks 1140-1170, so that the rightmost 4×4 bits of target block 1130 are written to filter buffer 1110B. A person of ordinary skill in the art should understand how multiplexers, shifters, and mask bits can be used to achieve this result regardless of the alignment of the 4×4 target to be fetched from texture cache 1060.

In the embodiment shown in FIG. 11, when target block 1130 spans a vertical texel boundary, the data is not reordered vertically. When this happens, the data loaded into filter buffers 1110A and 1110B is not in the same vertical sequence as the original sequence in the cache. In this embodiment, VPU 150 must vertically reorder (rotate) the 128-bit reference block data to match the sequence in the prediction block. In another embodiment, TFU 1050 vertically reorders the fetched texel data, to match the original cache sequence, before writing to one of the filter buffers 1110.

Any process descriptions or blocks in flowcharts should be understood as representing modules, segments, or portions of code which include one or more executable instructions for implementing specific logical functions or steps in the process. As would be understood by those of ordinary skill in the art, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A computer-implemented method for determining a motion vector describing motion relative to a reference block, the method comprising:

determining, by a computer, which of a plurality of prediction blocks is a good match with the reference block, according to a match criteria;

performing, by the computer, a local area exhaustive search to produce a best match with the reference block, the search performed in an area centered around the good match prediction block, the best match having integral pixel resolution;

modeling, by the computer, the degree of match between the best match and the reference block as a quadratic surface;

analytically determining, by the computer, a minima of the quadratic surface, the minima corresponding to a best matching block with fractional resolution, wherein the analytically determining comprises:

determining a first minima of the quadratic surface in a first direction; and determining a second minima of the quadratic surface in a second direction perpendicular to the first direction, wherein the second minima corresponds to a best matching block with fractional resolution; and computing, by the computer, a fractional motion vector based on the best matching block with fractional resolution.

2. The computer-implemented method of claim 1, wherein the determining step further comprises:

determining whether a current frame is intra-predicted; and determining which of the plurality of prediction blocks is the good match using a conjugated gradient descent search, if the current frame is intra-predicted.

3. The method of claim 1, wherein the determining step further comprises:

determining whether a current frame is inter-predicted; and determining which of the plurality of prediction blocks is the good match by searching neighboring blocks around the reference block, if the current frame is inter-predicted.

4. The computer-implemented method of claim 1, further comprising:

performing the local area exhaustive search on a set of four blocks located diagonally from the good match prediction block.

5. The computer-implemented method of claim 1, wherein the determining further comprises:

computing a sum-of-absolute-differences for blocks adjacent to the best match prediction block.

6. The computer-implemented method of claim 1, wherein the determining further comprises:

computing a sum-of-absolute-differences for a plurality of blocks, a first one of the plurality of blocks being adjacent in the first direction to the best match prediction block, each of the remaining blocks being adjacent to another one of the plurality of blocks.

7. The computer-implemented method of claim 1, wherein the determining further comprises:

computing a sum-of-absolute-differences (SAD) for a plurality of blocks, and wherein the computing is performed using a single SAD instruction executed by a graphics processor unit.

8. An apparatus for determining a motion vector describing motion relative to a reference block, the apparatus comprising:

a memory circuit having instructions stored therein;

a processor configured by the instructions to:

determine which of a plurality of prediction blocks is a good match with the reference block, according to a match criteria;

perform a local area exhaustive search to produce a best match with the reference block, the search performed in an area centered around the good match prediction block, the best match having integral pixel resolution; and analytically determine a minima of a quadratic surface which models the degree of match between the best match and the reference block, the minima corresponding to a best matching block with fractional resolution, wherein the analytically determining comprises:

determining a first minima of the quadratic surface in a first direction; and determining a second minima of the quadratic surface in a second direction perpendicular to the first direction, wherein the second minima corresponds to a best matching block with fractional resolution.

9. The apparatus of claim 8, wherein the processor is further configured by the instructions to:

search the plurality of prediction blocks using a conjugated gradient descent search to determine the good match, if the current frame is intra-predicted.

10. The apparatus of claim 9, wherein the processor is further configured by the instructions to:

select a candidate block from the plurality of prediction blocks;

compute a horizontal gradient between a first sum of differences (SAD) score of a first block at a fixed distance above the candidate block and a second SAD score of a second block at the fixed distance below the candidate block;

compute a vertical gradient between a third SAD score of a third block at the fixed distance to the left of the candidate block and a fourth SAD score of a fourth block at the fixed distance to the right of the candidate block;

adjust the fixed distance based on the horizontal and vertical gradients, if the first and second gradients are lower than a gradient threshold;

determine a plurality of new candidate blocks located at the adjusted fixed distance from the block from the first, second, third and fourth blocks having the lowest SAD score; and repeat the steps after the selecting step for each of the new candidate blocks.

11. The apparatus of claim 10, wherein the processor is further configured by the instructions to:

compare the first, second, third, and fourth SAD scores to a SAD threshold, if the first and second gradients are greater than or equal to the gradient threshold; and determine the good match to be the block from the first, second, third and fourth blocks having the lowest SAD score, if any of the first, second, third, and fourth SAD scores are below the SAD threshold.

12. The apparatus of claim 8, wherein the processor is further configured by the instructions to:

compare the first, second, third, and fourth SAD scores to a SAD threshold, if the first and second gradients are greater than or equal to the gradient threshold; and determine the good match to be the block from the first, second, third and fourth blocks having the lowest SAD score, if any of the first, second, third, and fourth SAD scores are below the SAD threshold.

13. A non-transitory computer readable medium having a program for determining a motion vector, the program comprising logic configured to perform the steps of:

determining which of a plurality of prediction blocks is a good match with the reference block, according to a match criteria;

performing a local area exhaustive search to produce a best match with the reference block, the search performed in an area centered around the good match prediction block, the best match having integral pixel resolution;

modeling the degree of match between the best match and the reference block as a quadratic surface;

analytically determining a minima of the quadratic surface, wherein the analytically determining comprises:

determining a first minima of the quadratic surface in a first direction; and determining a second minima of the quadratic surface in a second direction perpendicular to the first direction, wherein the second minima corresponds to a best matching block with fractional resolution; and computing a fractional motion vector based on the best matching block with fractional resolution.

14. The non-transitory computer readable medium of claim 13, wherein the determining step further comprises:

determining whether a current frame is inter-predicted or intra-predicted;

determining which of the plurality of prediction blocks is the good match using a conjugated gradient descent search, if the current frame is intra-predicted;

determining which of the plurality of prediction blocks is the good match by searching neighboring blocks around the reference block, if the current frame is inter-predicted.

15. The non-transitory computer readable medium of claim 13, further comprising:

determining whether a current frame is inter-predicted;

determining which of the plurality of prediction blocks is the good match by searching neighboring blocks around the reference block, if the current frame is inter-predicted; and performing the local area exhaustive search in an area surrounding, and centered around, the good match prediction block.

16. The non-transitory computer readable medium of claim 13, further comprising:

determining whether a current frame is inter-predicted;

determining which of the plurality of prediction blocks is the good match using a conjugated gradient descent search, if the current frame is intra-predicted; and performing the local area exhaustive search on a set of four blocks located diagonally from the good match prediction block.

17. The non-transitory computer readable medium of claim 13, wherein the determining further comprises: computing a sum-of-absolute-differences for blocks adjacent to the best match prediction block.

18. The non-transitory computer readable medium of claim 13, wherein the determining further comprises: computing a sum-of-absolute-differences for a plurality of blocks, a first one of the plurality of blocks being adjacent in the first direction to the best match prediction block, each of the remaining blocks being adjacent to another one of the plurality of blocks.

19. The non-transitory computer readable medium of claim 13, wherein the first minima lies along a minima line in the first direction, and the second minima is determined along the minima line.

* * * * *